UNITED STATES PATENT OFFICE.

HENRY MEDLOCK, OF NO. 22 TAVISTOCK SQUARE, AND WILLIAM BAILEY, OF WOLVERHAMPTON, GREAT BRITAIN.

IMPROVEMENT IN PRESERVING ANIMAL SUBSTANCES.

Specification forming part of Letters Patent No. 117,660, dated August 1, 1871.

*To all whom it may concern:*

Be it known that we, HENRY MEDLOCK, of No. 22 Tavistock Square, in the county of Middlesex, analytical chemist, and WILLIAM BAILEY, of Wolverhampton, in the county of Stafford, manufacturing chemist, both in the United Kingdom of Great Britain, have invented certain Improvements in Preserving Animal Substances; and we do hereby declare the following to be a full, clear, and exact description of the same.

The object of our said invention is to preserve animal substances, such as meat, poultry, game, fish, &c., for a long time, and so that such substances, when so preserved, although the animals from which the same are derived may have been killed for a considerable time, cannot be distinguished, when cooked, from the like substances derived from similar animals which have been recently killed; it is also adapted for the preservation of hides.

The manner in which our said invention is performed is as follows: We employ a solution hereinafter distinguished as solution No. 1, being a solution of bisulphite of lime, usually expressed by the formula $CaO, 2 SO_2$, and which is prepared by passing a current of sulphurous-acid gas (produced by the action of carbon on sulphuric acid with the aid of heat, or by any other of the usual and well-known methods as described in all the treatises on or manuals of chemical manipulation) into water containing suspended therein, by suitable means, a due proportion, say about six ounces to the gallon, of prepared or purified carbonate of lime, until such time as the liquid attains the desired strength, as ascertained by a suitable hydrometer, viz., until it contains ninety per cent. of pure bisulphite of a gravity of 1.050, and will of itself (if unmixed with other matters) possess a density of 1.045.

We sometimes form a solution, hereinafter distinguished as solution No. 2, by dissolving the ordinary commercial gelatine in boiling water, using from one part to two parts of gelatine in ten parts of water, and adding ten parts of solution No. 1. In determining the proportion of gelatine to be used we increase such proportion in reverse ratio to the decrease of the temperature of the place at which the solution is to be applied, using a larger proportion of gelatine when the temperature is low, and a smaller proportion of gelatine when the temperature is high.

Solution No. 2 is adapted for coating animal substances intended to be preserved, such as joints of meats, animals which have been skinned, poultry and birds which have been plucked, fish, and also the internal surfaces of hides. For this purpose the viscera of the animals, birds, and fish, and also the gills of fish, should be removed, and the inside washed so as to be thoroughly cleansed from blood and offensive matter. We then apply solution No. 2, while still warm and liquid, to coat such animal substances, either by dipping such substances into such solution or by brushing such substances over with two or three coats of such solution. Such solution is then allowed to dry and solidify, and, if required, we pack such animal substances in casks or other suitable vessels rendered as air-tight as may be. As to hides, we first cleanse the same by washing the inside thereof. We then apply solution No. 2 while still warm and liquid, to coat the interior surface of such hides; but such interior coating, and also the hides themselves, must be rendered dry before the hides can be packed. The hides can then be packed in casks or other suitable vessels; but if the hides are to be used within a short period, say two months after the application of this solution, we do not find such packing necessary.

For the preservation of animals without removing the skin or external covering thereof, and without removing hoofs or horns, we find it advantageous to employ a solution, hereinafter distinguished as solution No. 3, formed by mixing one part of salt with ten parts of solution No. 1, and from six to ten parts of water. We vary the proportion of water according to the temperature of the place at which the solution No. 3 is to be applied, using a larger proportion of water where such temperature is low, and a smaller proportion of water where such temperature is high. For this purpose, at the slaughtering of the animal, as soon as the bleeding ceases and while the animal is still warm, we (by any ordinary process of injection) force solution No. 3, heated to a temperature of from 100° to 110° Fahrenheit, into the arteries and veins leading from and to the heart of the animal. We then remove the viscera of the animal and wash the inside of such animal so as thoroughly to cleanse the same from blood and offensive matter, and the inside of the animal may be washed with solution No. 3. The animal can then be packed in a canvas wrapper or in some other suitable packing.

For the preservation of fish we find it advantageous to employ a pickle or solution, hereinafter distinguished as solution No. 4, formed by mixing ten parts of cold water, one part of salt, and one part of solution No. 1. For this purpose we first deprive the fish of the viscera and gills and wash the inside of the fish so as to cleanse the same from offensive matter. We then pack the fish in casks or other suitable vessels, fill up such casks or vessels with solution No. 4, and then close such casks or vessels so as to render the same as air-tight as may be.

Poultry and game may be similarly treated with solution No. 4, having been first plucked or skinned and the viscera removed.

We find that solution No. 4 is also useful for preventing and arresting decomposition in fresh butchers'-meat, game, poultry, and fish. For this purpose the animal substance to be treated may be dipped into the solution, or wrapped in a cloth saturated with the solution.

The proportions of the substances employed to form solution No. 2, solution No. 3, and solution No. 4 are respectively reckoned by weight and not by volume.

When animal substances are to be transported dry in wooden casks or other wooden vessels, the interior of such casks or vessels should, before use, be saturated with solution No. 1, and then allowed to dry; but for this we make no claim.

Before any animal substance which has been coated or treated with solution No. 3 or solution No. 4 is cooked, the effect of the coating or solution should be removed by soaking the substance for a sufficient time in water.

We do not claim the employment of gelatine or salt, nor of the processes of cleansing or injection, nor of air-tight vessels, except in connection with and in aid of solution No. 1, except for the purpose of preserving animal substances.

What we consider to be novel and improvements, and therefore we claim, are—

1. The use of solution No. 1 for preserving animal substances.

2. The preservation of joints of meat, animals from which the skin or feathers have been removed, fish, and hides, by means of solution No. 2, in manner hereinbefore described.

3. The preservation of animals without removing the skin, by means of solution No. 3, in manner hereinbefore described.

4. The preservation of fish, game, and poultry by means of solution No. 4, in manner hereinbefore described.

5. The preventing and arresting decomposition in animal substances by means of solution No. 4, in manner hereinbefore described.

HY. MEDLOCK.
WILLIAM BAILEY.

Witnesses:
ALEX. C. M. PRINCE,
    4 *Trafalgar Square, Charing Cross.*
G. F. WARREN,
    *No. 17 Gracechurch street, London.*
JOHN HARRISON,
    *Notary Public, London.*